March 4, 1947.   D. B. PARKINSON   2,416,713
CALL TRANSMITTER
Filed July 30, 1943   8 Sheets-Sheet 1

INVENTOR
D.B. PARKINSON
BY J. MacDonald
ATTORNEY

March 4, 1947.　　　D. B. PARKINSON　　　2,416,713
CALL TRANSMITTER
Filed July 30, 1943　　　8 Sheets-Sheet 2

INVENTOR
D. B. PARKINSON
BY J. MacDonald
ATTORNEY

March 4, 1947.  D. B. PARKINSON  2,416,713
CALL TRANSMITTER
Filed July 30, 1943  8 Sheets-Sheet 4
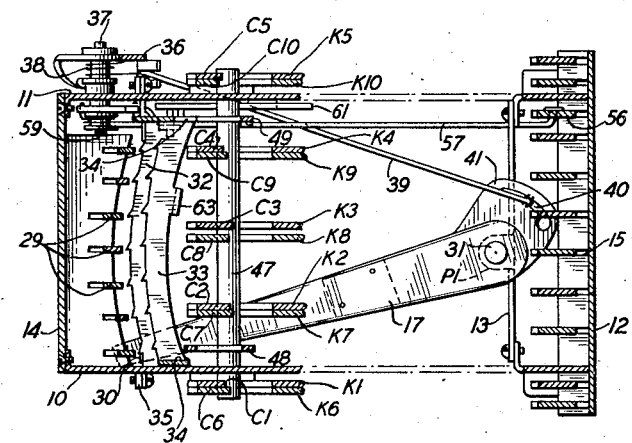
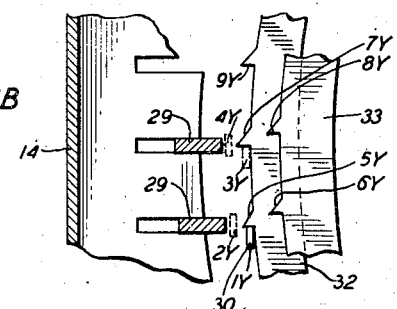
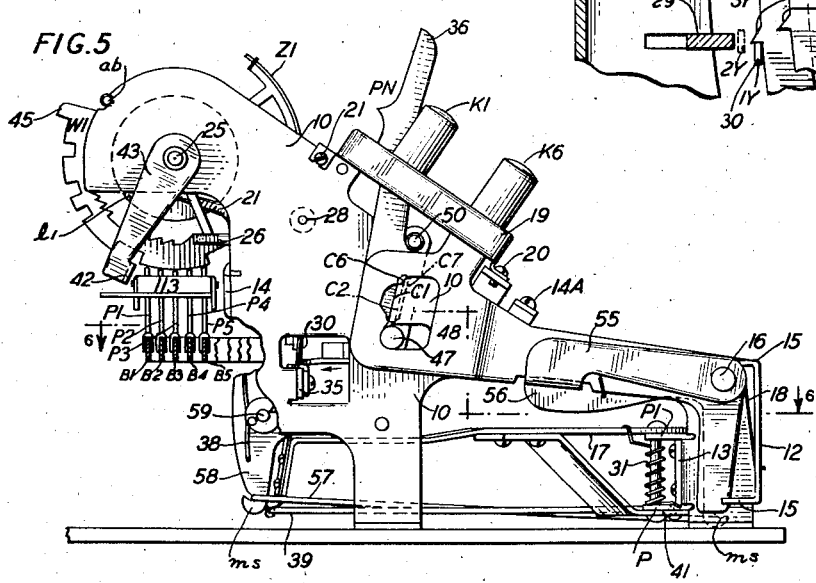
INVENTOR
*D.B. PARKINSON*
BY *J. MacDonald*
ATTORNEY March 4, 1947.   D. B. PARKINSON   2,416,713
CALL TRANSMITTER
Filed July 30, 1943   8 Sheets-Sheet 5

INVENTOR
D.B. PARKINSON
BY J. MacDonald
ATTORNEY

March 4, 1947.   D. B. PARKINSON   2,416,713
CALL TRANSMITTER
Filed July 30, 1943   8 Sheets-Sheet 6
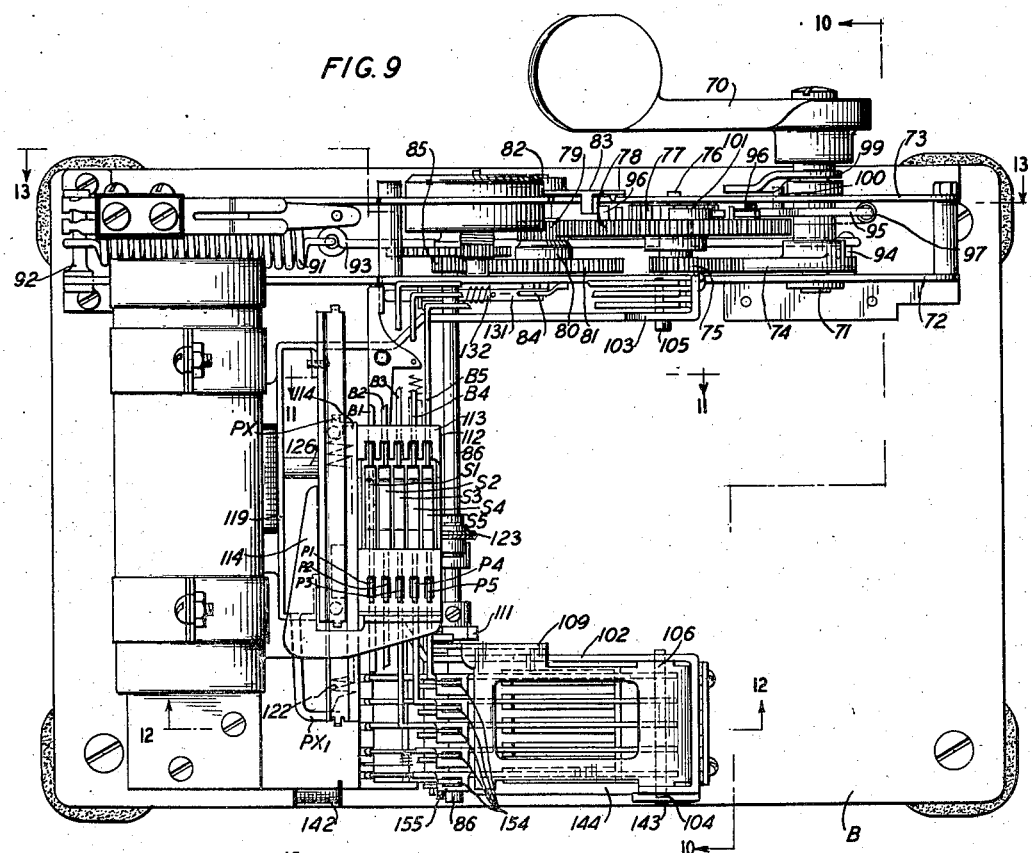
INVENTOR
D. B. PARKINSON
BY J. Mac Donald
ATTORNEY March 4, 1947.   D. B. PARKINSON   2,416,713
CALL TRANSMITTER
Filed July 30, 1943   8 Sheets-Sheet 7

INVENTOR
D.B. PARKINSON
BY J. MacDonald
ATTORNEY

March 4, 1947.  D. B. PARKINSON  2,416,713
CALL TRANSMITTER
Filed July 30, 1943  8 Sheets-Sheet 8

INVENTOR
D. B. PARKINSON
BY J. MacDonald
ATTORNEY

Patented Mar. 4, 1947

2,416,713

UNITED STATES PATENT OFFICE 2,416,713

CALL TRANSMITTER

David B. Parkinson, Maplewood, N. J., assignor to Bell Telephone Laboratories, Incorporated, New York, N. Y., a corporation of New York Application July 30, 1943, Serial No. 496,747

14 Claims. (Cl. 177—380)

This invention relates to telephone call transmitters of the type in which the successive operation of numbered key members is effective to set code members in position for controlling the operation of vibrative elements in a magnetic field for transmitting signals corresponding to the numbers of the operated keys.

The object of the invention is to improve the construction and operation of such call transmitters and to decrease the so-called dialing time in the transmitting of telephone call designations.

A feature of the invention is the provision of a plurality of code wheels mounted for free rotation on a common shaft with means for individually holding such wheels in normal non-operated position following the tensioning of their respective actuating springs.

Another feature is the provision of a transfer mechanism for successively causing the operation of the code wheels under tension of their actuating springs according to the successive operation of the key members.

Another feature is the provision of means carried by the code wheels engaging means actuated differentially by the movement of the keys for arresting the movement of the code wheels to positions corresponding to the numbers of the keys for setting a call, with means positioned by the setting operation of the code wheels for indicating the number of the call.

Another feature is the provision of manually operable means for collectively returning the code wheels to normal non-operated position either following a code transmitting operation or cancelling a wrong call setting operation, the return movement of the code wheels to normal retensioning their actuating springs.

Another feature is the provision of a carriage, operable step by step, for successively positioning feeler members in registry relation with the code wheels, means being provided for automatically returning the carriage to normal position at the completion of each call transmitting operation.

Another feature is the provision of a cam shaft actuated by a motor mechanism serving to move the feeler members in coacting relation with the positioned code elements in timed relation to the step-by-step operation of the carriage, the operation of the cam shaft, in addition, operating a plurality of means for successively tensioning, locking and releasing the vibrative elements of the generator for transmitting the call.

Another feature is the provision of a speed governor actuated by the motor mechanism for controlling the operation of the cam shaft and thereby that of the reeds tensioning, locking and releasing mechanisms in the transmitting of a call.

Other novel features and advantages of the invention will appear from the following description and by the claims appended thereto, reference being had to the accompanying drawings in which:

Fig. 5 is a right side elevation view of the digit setting mechanism shown with a number of operating parts with portions cut away, the keys and the code wheels being shown in normal non-operated position.

Fig. 6 is a horizontal sectional view of the code wheels setting mechanism taken on line 6—6 of Fig. 5.

Fig. 6B is a partial view of the digit setting mechanism enlarged.

Fig. 9 is a top view of the generator actuating mechanism shown with the code setting mechanism removed from the supporting base, a number of operating parts being shown with portions cut away.

Figure 10A:
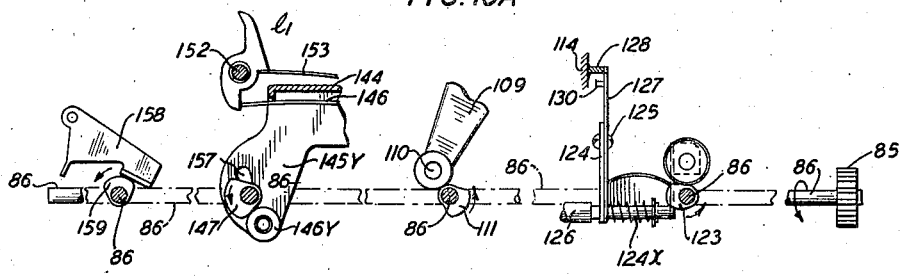
Fig. 10 is a vertical section taken on line 10—10 of Fig. 9 showing the combined code and indicating wheels schematically.

Fig. 10A is a view of the cam shaft used in the generator actuating mechanism showing the position of the cams in angular relation to each other.

Figure 11:
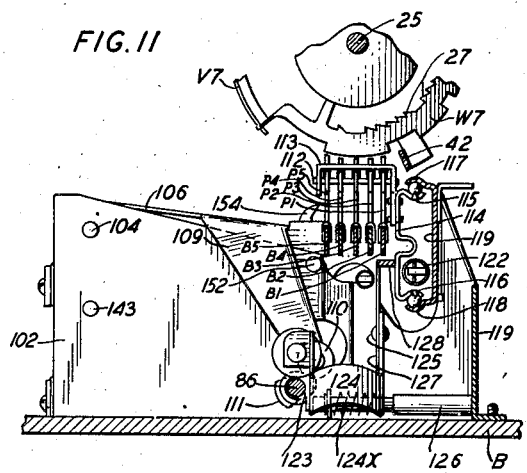

Fig. 11 is a partial view shown in vertical section taken on line 11—11 of Fig. 9.

Figure 12A:
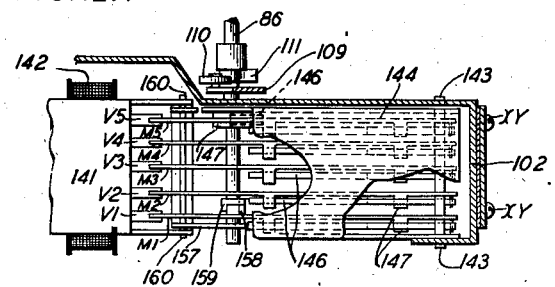
Figure 12:
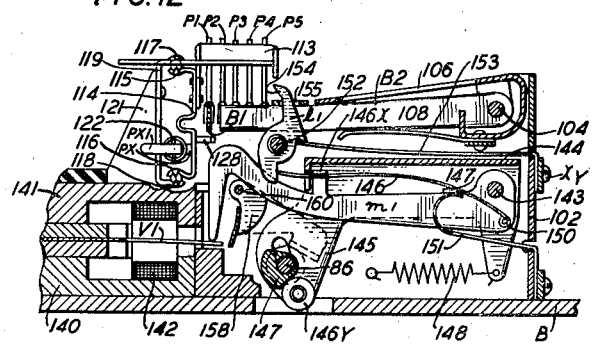

Fig. 12 is a partial view shown in vertical section taken on line 12—12 of Fig. 9.

Fig. 12A is a detail view showing elements of the reeds actuating mechanism and a number of operating parts in section.

Figure 13:
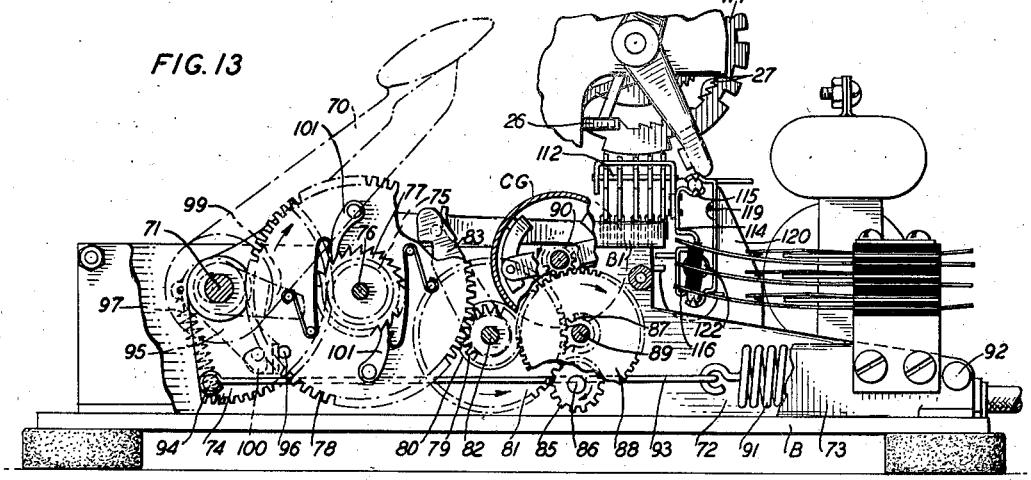

Fig. 13 is a partial view showing the motor mechanism in vertical section taken on line 13—13 of Fig. 9.

Figure 14:
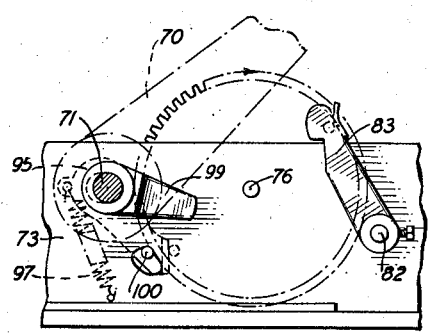

Fig. 14 is a partial view showing the mechanism for controlling the return movement of the carriage to normal unoperated position and for stopping the motor mechanism at the conclusion of each call transmitting operation.

Figure 15:
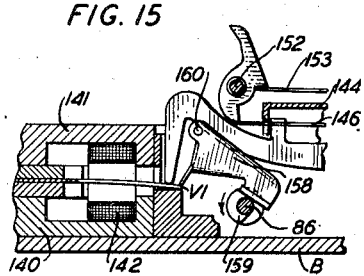

Fig. 15 is a view of the alternating current generator shown in vertical section, with the vibrative elements held in the tensioned position by the pawl-like members under control of the cam shaft.

Figures 21, 22:
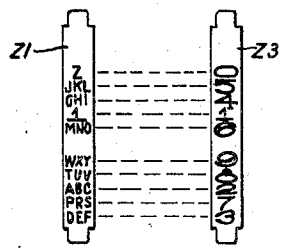

Figs. 16, 17, 18, 19 and 20 are views of the combined code and indicating wheels shown in different operated positions relative to the feeler members mounted on the carriage; and Figs. 21 and 22 are views of the indicating strips or dials carried by the code wheels, the strips being shown developed.

Figure 6A:
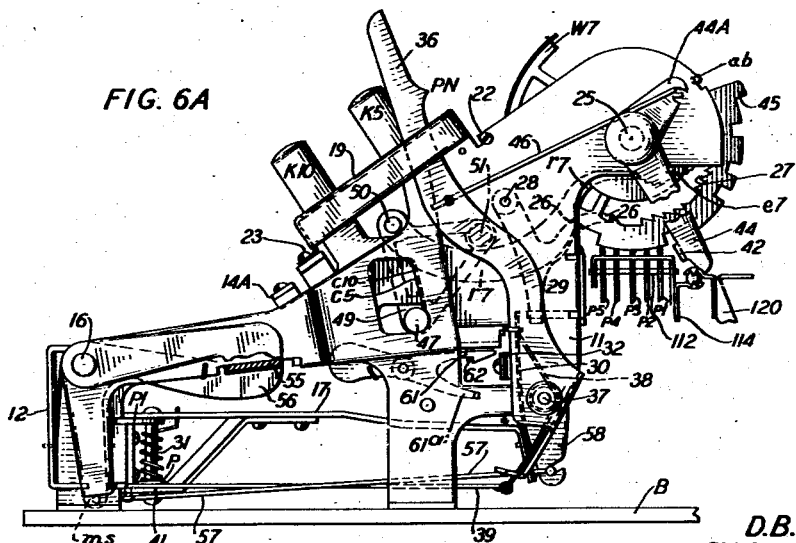
Fig. 6A is a right side elevation view of the combined code and indicating wheels setting mechanism and their resetting mechanism shown in normal non-operated position, a number of operating parts being shown with portions cut away.
Figure 7:
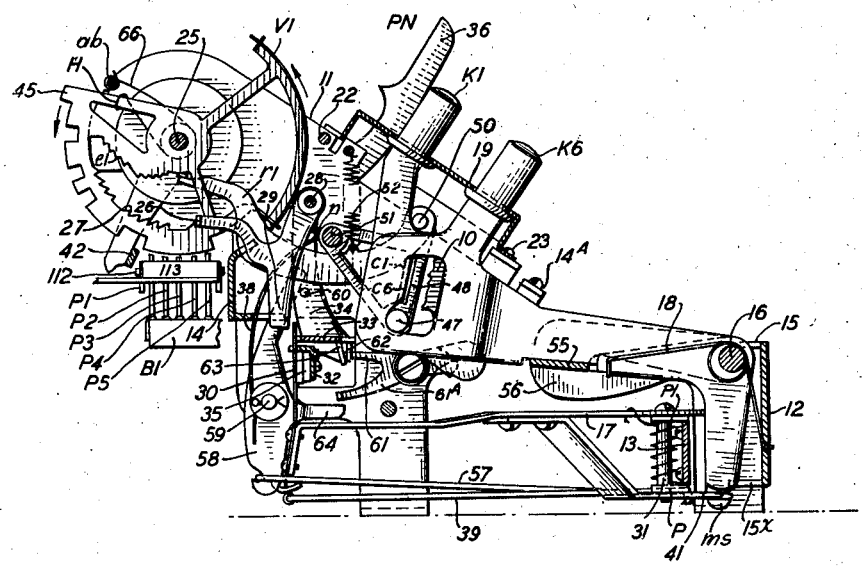
Fig. 7 is an assembly view of the code wheels setting mechanism shown in vertical section taken on line 7—7 of Fig. 4, the combined digit and indicating wheels being shown in normal non-operated position.
Figure 8:
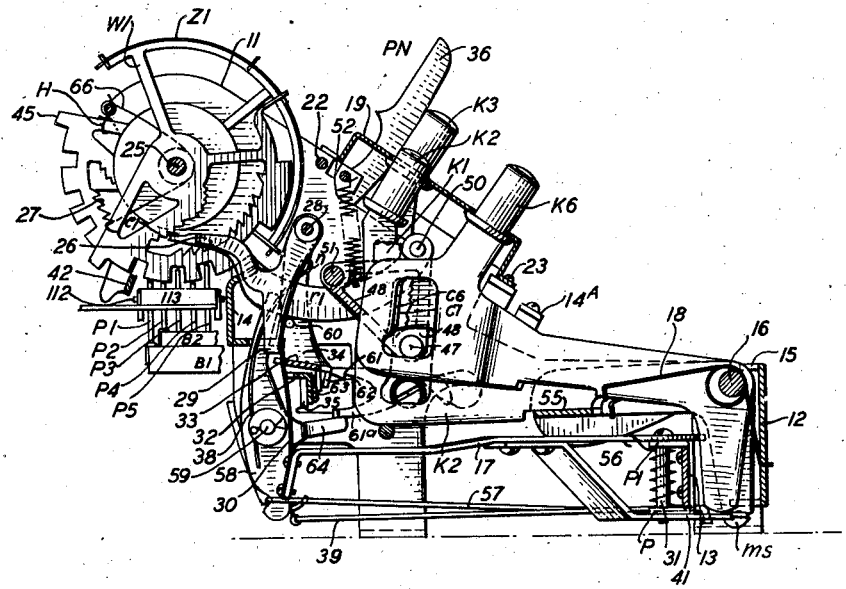
Fig. 8 is a view similar to that of Fig. 7 but shown with one of the keys and one of the code wheels in the operated or set position.

In the drawings as shown in Figs. 2, 3, 5 and 6A, a base B is provided for securely mounting two upright supports 10 and 11 held in parallel relation to each other at points above the plate B by spacer plates 12, 13, 14 and 14A, best seen in Figs. 7 and 8, spacer plate 12 having at its opposite longitudinal edges slots 15, 15X serving to hold key members K1, K2, K3, K4, K5, K6, K7, K8, K9 and K10 in spaced relation to each other on a common shaft 16 journaled at both ends in bearings in plates 10 and 11, while the spacer plate 13 is provided with inwardly extending projections P—P1 serving as bearings for pivotally mounting an arm 17 for movement parallel to the plane of base B to perform a function which will be hereinafter described in detail.

Figure 1:
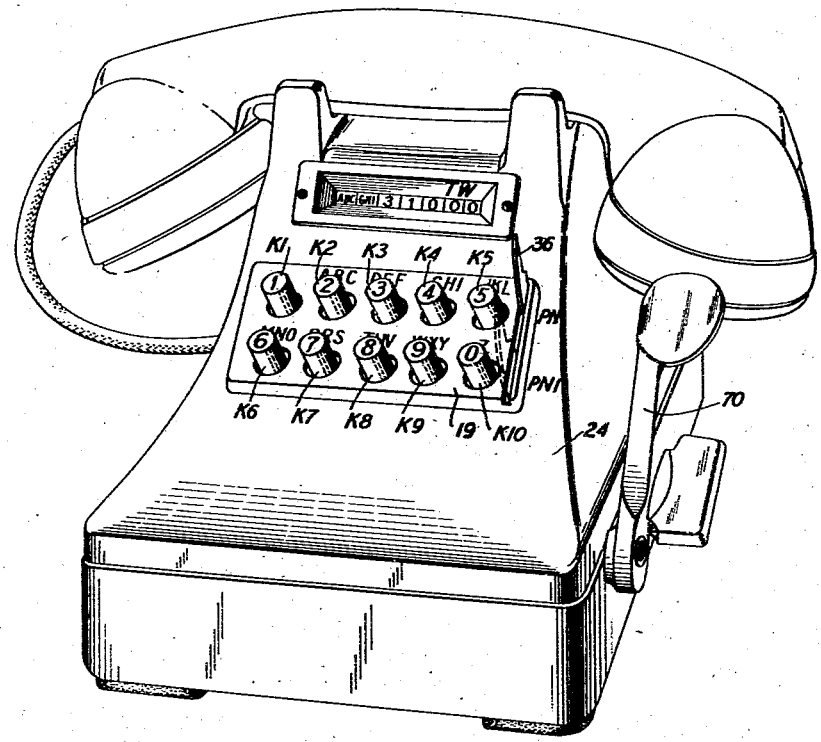
Fig. 1 is an elevation view shown in perspective with the indicating wheels in the operated or registering position.
Figure 2:
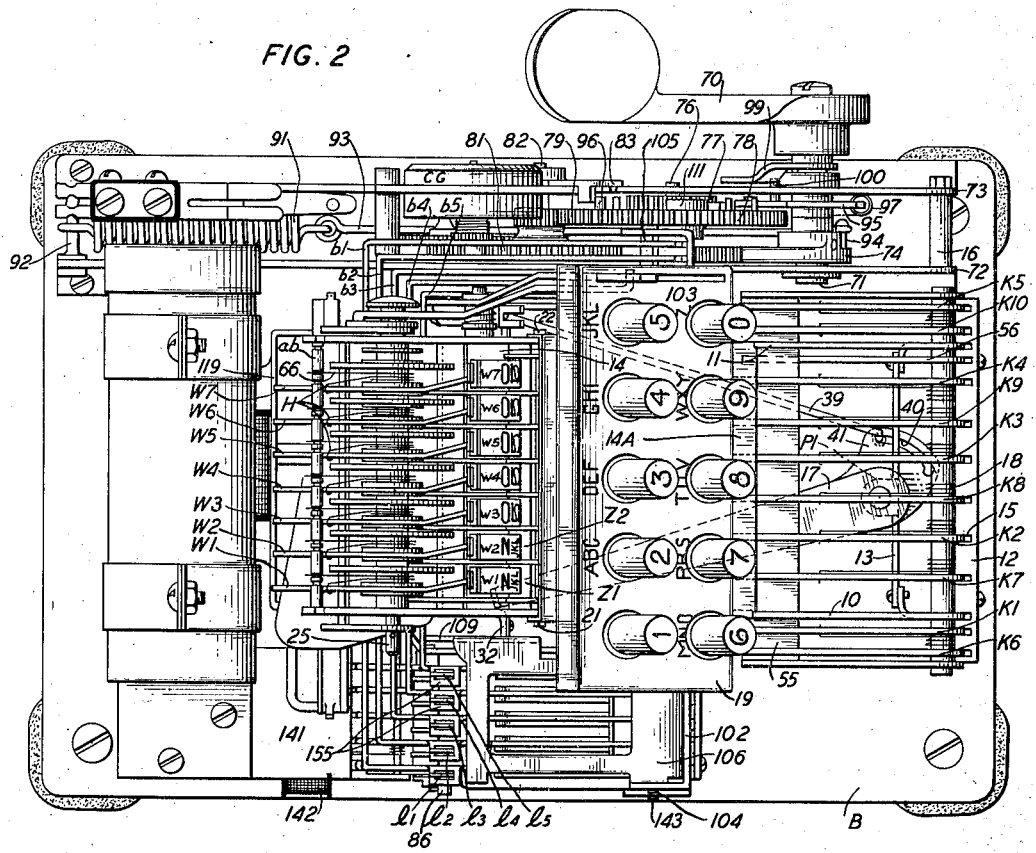
Fig. 2 is a top view of the call transmitter mechanism shown with the casing removed from its supporting base, the operating parts and combined code and indicating wheels being shown in normal non-operated position.

The key members K1, K2, K3, etc., are held in normal nonoperated position by similar retractile springs 18 coiled on shaft 16 and having one of their ends extending through openings in the plate 12 and their other ends hooked to their respective keys while a cover plate 19 secured at its corner portions to upright supports 10 and 11 by similar screws at points 20, 21, 22 and 23 is provided to close a rectangular opening OP in a casing 24 serving for housing the transmitter mechanism, this cover plate having openings through which the knobs of the keys K1, K2, K3, etc., protrude in registry with letter designations printed on the cover plate, while numerical designations are printed on the respective keys as shown in Figs. 1 and 2.

On upright supports 10 and 11 is journaled a shaft 25 on which are mounted for free rotation thereon the code wheels W1, W2, W3, W4, W5, W6 and W7, the code wheels W1 and W2 having dials in the form of strips Z1 printed with similar letter designations as shown in Fig. 21, while the code wheels W3, W4, W5, W6 and W7 are provided with dials Z3 on which are printed the digits 1 to 10 in the order shown in Fig. 22 corresponding to the digit printed on the keys and the letter designations which are printed on the cover plate 19. The code wheels W1, W2, W3, etc., are held in their normal non-indicating or non-operated position against the tension of respective actuating springs 66 by similar pawls at 26 best seen in Figs. 5, 6A, 7 and 8 engaging ratchet teeth 27 interiorly formed and concentric to the code wheels W1, W2, W3, etc., the springs 66 being coiled on the hubs of their respective wheels W1, W2, W3, etc., with one of their ends hooked to a bar ab journaled in upright supporting plates 10 and 11 and the other ends of these springs hooked to their respective code wheels as at point H shown in Figs. 2, 4, 7 and 8.

The pawls 26 are pivotally mounted on a shaft 28 journaled in upright supports 10 and 11 and are formed with downwardly extending projections 29 best seen in Figs. 6A, 7 and 8, disposed for successive engagement by a flexible reed 30 carried at the free end of pivoted arm 17, the latter being movable transverse of code elements W1, W2, W3, etc., step by step by the tension of a spring 31 under control of an escapement mechanism consisting of two cooperating saw-toothed racks 32 and 33, see Figs. 6 and 6B, the latter being formed at its ends with arms 34 pivoted on shaft 28 for swinging movements as effected by the operation of any one of the keys K1, K2, K3, etc., in a manner which will be hereinafter described in detail, while the rack 32 is secured at both ends to similar lugs 35 formed and laterally extending from the upright supports 10 and 11.

Figure 4:
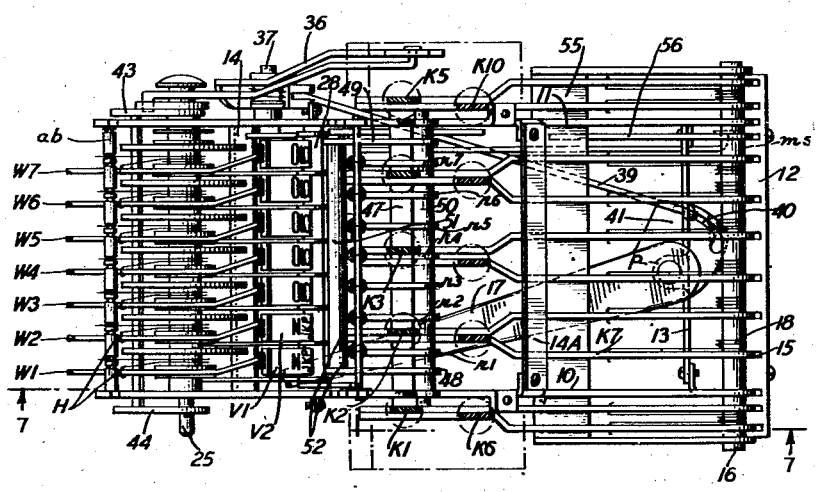
Fig. 4 is a top view of the digit setting mechanism showing the combined code and indicating wheels in normal non-operated position, the keys being shown in horizontal section taken on line 4—4 of Fig. 3.

The arm 17 is moved in normal starting position following each call transmitting operation by the manual operation of a handle lever 36 movable from the position pn to the position pn1 shown in dotted line in Fig. 1. This handle lever is pivoted as shown in Figs. 4, 6 and 6A on a stud 37 laterally extending from the upright supporting plate 11. The operation of this handle lever as for causing the operation of the arm 17 is effective to tension a spring 38, coiled on stud 37 and having one of its ends hooked to the arm 36 and its other end connected to one end of a rod 39, the other end of which engages a slot 40 in a sector-shaped portion 41 secured to and serving as a bearing for the horizontally movable arm 17, the slot 40 (see Figs. 2, 4 and 6) providing a motion take-up for the rod 39 whereby the arm 36 may be returned to normal unoperated position following the return movement of escapement arm 17 and reed 30 carried thereby to normal position while performing another function which will be hereinafter described in detail.

The operation of handle lever 36 from the position pn to the position pn1 is as above described effective to return the arm 17 and the flexible reed 30 carried thereby to normal starting position shown in Figs. 2, 4, 6 and 7 while tensioning the spring 31 and actuating a U-shaped bar 42 in a movement concentric to the code wheels W1, W2, W3, etc., this bar having its arms 43 and 44 pivoted on shaft 25 and connected through an extension 44A (see Fig. 6A) to a rod 46, the other end of which connects with the arm 36, the movement of bar 42 engaging projections at 45 carried by each of the code wheels W1, W2, W3, etc., for returning them collectively to normal non-operated position following each code transmitting operation and/or for cancelling a wrong call setting operation, while the movement of rod 39 in slot 40 of lever 17 permits the return movement of handle lever 36 and thereby the return movement of bar 42 to normal, thus freeing of code wheels W1, W2, W3, etc., preparatory to their movements for the setting of a call.

The keys K1, K2, K3, etc., as shown in Figs. 5, 6, 6A, 7 and 8 are provided with cam surfaces C1, C2, C3, C4, C5, C6, C7, C8, C9 and C10 disposed in engageable relation with a common bar 47 of cylindrical cross-section secured at both ends to triangularly-shaped lever members 48 and 49 in turn pivoted on a shaft 50 journaled in bearings formed with the upright supports 10 and 11. Shaft 50 serves also for pivotally mounting setting pawls r1, r2, r3, r4, r5, r6 and r7 extending in engageable relation with respective spirally-shaped ratchet elements e1, e2, e3, e4, e5, e6 and e7 formed with the code wheels W1, W2, W3, etc. These pawls as best seen in Figs. 6A, 7 and 8 are operated collectively against the tension of similar retractile springs 52 by the common bar 51 but set into positions relative to the teeth of their respective spiral ratchet elements e1, e2, e3, etc., by the different swinging movements of bar 51 as imparted by the camming portions C1, C2, etc., of key members K1, K2, K3, etc., acting on the bar 47.

A U-shaped bar 55 shown in Figs. 2, 3, 4, 5, 6A, 7 and 8 has its arm pivoted on shaft 16 and extends transverse of key members K1, K2, K3, etc., to the underside thereof for movement by the operation of any one of the keys. This bar serves for actuating an angle lever 56 also pivoted on shaft 16 and having one of its arms MS extending downwardly for connection with one end of a rod 57, the opposite end of which is connected to a yoke 58 best seen in Figs. 7 and 8 pivotally mounted on a stud 59 extending laterally from upright support 11 coaxially disposed to stud 37 serving as pivot for the handle lever 36. The upper extending arm of yoke 58 engages a pin 60 laterally extending from the arm 34 of pivoted escapement element 33 for normally holding the latter in retracted position as shown in Fig. 7 by the normal tension of a spring 38 where the escapement element 33 locks with a spring-pressed pawl 61 engaging a projection 62 of this element. A lug 63 carried by escapement element 33 is provided for engaging the escapement element 32 for controlling the angular or swinging movement of escapement element 33 toward operated position and thereby controlling the movement of pawls 26 as effected by the successive operation of the reed 30 under the tension of spring 38 following the pivotal movement of the yoke 58 timed to occur prior to the disengagement of spring-pressed pawl 61 from escapement element 33, the operation of which forces the reed 30 against the downwardly extending arms 29 of retaining pawls 26 for moving them out of engagement from the concentrically formed ratchet elements 27 of code wheels W1, W2, W3, etc., in response to the succeeding operation of key members K1, K2, K3, etc., for setting a call.

The mechanism for transmitting signals according to the setting of the code wheels W1, W2, W3, etc., consists of a handle lever member 70 keyed to one end of a shaft 71, Figs. 1, 2, 9, 10 and 13, for manual operation outside of the casing 24. Shaft 71 is journaled in two upright supporting plates 72 and 73 best seen in Figs. 2, 9 and 10 secured at their lower ends to the base B and on shaft 71 between the plates 72 and 73 is keyed a gear sector 74 meshing with a pinion 75, keyed on a shaft 76 formed with a ratchet wheel 77 and on the shaft 76 is mounted for free rotation thereon a gear 78 actuated by the ratchet wheel 77 through two diametrically opposite spring-pressed pawls 101—101, see Fig. 13. The gear 78 meshes with a pinion 79 formed at one end of a sleeve 80 to the other end of which is keyed a gear 81, the sleeve 80 mounted for free rotation on a shaft 82 journaled in the supporting plates 72 and 73 while to the opposite ends of shaft 82 are securely mounted the lever members 83 and 84 best seen in Fig. 9 provided to perform a function which will be hereinafter described in detail. The gear 81, best seen in Fig. 13, meshes with a pinion 85 keyed to one end of a cam shaft 86 and with a pinion 87, secured for movement as a unit with a gear 88 on a spindle 89 extending laterally from supporting plate 73. The rotation of gear 88 is imparted to a pinion 90 keyed to the shaft of a centrifugal speed governor CG best seen in Figs. 2, 9, 10 and 13 provided for controlling the operation of cam shaft 86 as imparted by the gearing mechanism above described under the tension of a motor spring 91, the latter having one of its ends hooked to a stud 92 supported by upright plates 72 and 73 and the other end of this spring is connected to a rod 93 in turn having its opposite end connected to the gear sector 74 by a pivot 94, the gear ratio being such as to impart seven turns to cam shaft 86 for each manual operation of handle lever member 70 or half turn of gear 78 as controlled by a pawl or arm 95 mounted for free rotation on shaft 71 with its free end positioned by a spring 97 in engageable relation with two diametrically opposite pins 96 best seen in Figs. 9, 10 and 13 laterally extending from the gear 78 for arresting the movement of the motor mechanism following each half turn of gear 78, or as above mentioned, seven turns of cam shaft 86.

Arm 95 is disengageable from any or one of pins 96 as the case may be by an arm 99, see Figs. 9 and 14, keyed on shaft 71 for engaging a pin 100 extending laterally from the arm 95 through an opening in the plate 73 upon the operation of handle lever 70 as for tensioning the motor spring 91.

Figure 3:
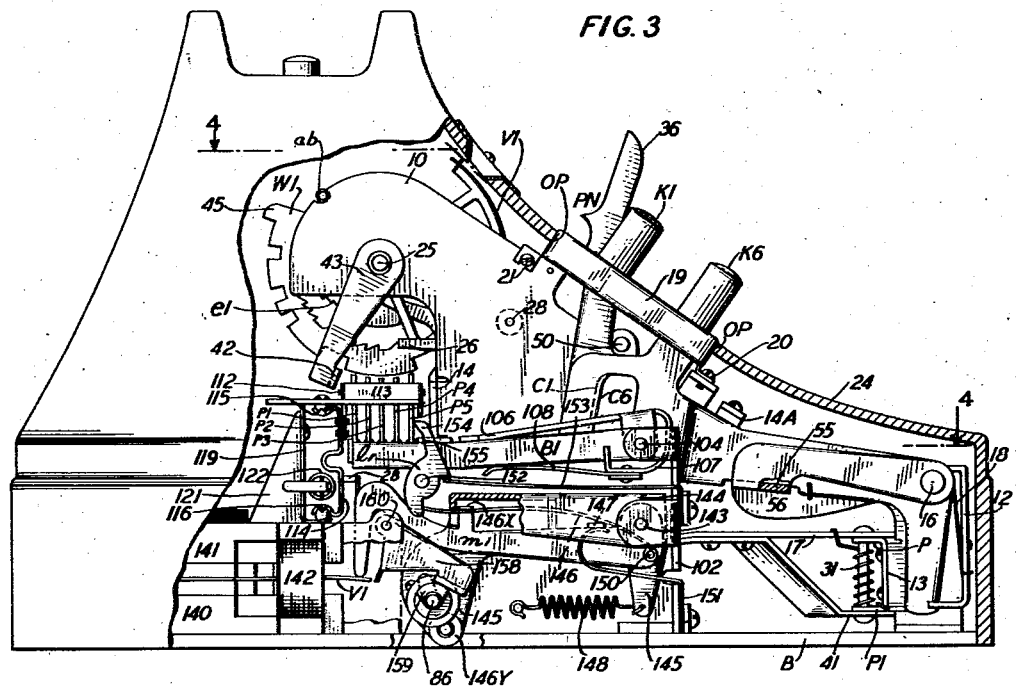
Fig. 3 is a left side elevation view showing the casing partly in vertical section and the operating parts in normal non-operated position.

A pair of upright supports 102 and 103 best seen in Figs. 2, 9 and 10 are secured at their lower ends to the base B and on these supports are pivotally mounted as on shafts 104 and 105, the arms of a set of U-shaped bars B1, B2, B3, B4 and B5 while on shaft 104 is also pivoted a plate 106 having a downwardly turned portion 107 substantially concentric to pivot 104, see Fig. 3, provided for mounting similar ribbon-shaped springs 108 serving for normally and yieldably holding the U-shaped bars B1, B2, B3, B4 and B5 in engageable relation with the free end of plate 106 but to permit the movement of this plate as effected by a cam 111 on cam shaft 86 independently of bars B1, B2, B3, B4 and B5 in combinations determined by the set position of code wheels W1, W2, W3, etc., as will be hereinafter described in detail. Plate 106 as shown in Figs. 2, 9, 10, 11 and 10A is formed with a downwardly extending arm 109 to the free end of which is mounted a roller 110 disposed in engageable relation with the cam 111, keyed on cam shaft 86 for operating the plate 106 and thereby the bars B1, B2, B3, B4 and B5 through the tension of their respective springs 108 but as above mentioned in combination depending upon the setting of code wheels W1, W2, W3, etc.

The movement of bars B1, B2, B3, B4 and B5, as effected by their respective springs 108, upon the movement of plate 106 by cam 111, is effective to impart reciprocating movements to respective feeler members P1, P2, P3, P4 and P5 shown in Figs. 3, 9 and 10, pivoted on a common shaft 112 itself supported at both ends in bearings in an inverted U-shaped plate 113. These feeler members are held in operative relation with the bars B1, B2, B3, B4 and B5 by retractile springs S1, S2, S3, S4 and S5, while the inverted U-shaped plate 113 is secured as by rivets to a rectangularly-shaped plate 114 having race tracks 115 and 116, Figs. 11 and 12, cooperating with a stationary plate 119 having race tracks 117 and 118 to form a ball bearing mounting for the carriage 113 thus formed, the plate 119 being formed integrally with the upright support 103 as shown in Fig. 9 while a spring 122 hooked to a pin PX laterally extending from the carriage plate 114 and its other bent to an arm PX1 extending longitudinally of plate 119 is provided for returning the carriage 113 to normal non-operated position shown in Figs. 9 and 10, following each movement transverse of the combined code and indicating wheels W1, W2, W3, etc.

The movement of carriage 113 and feeler members P1, P2, P3, etc., mounted thereon transverse of the combined code and indicating wheels W1, W2, W3 is effected by a step-by-step actuating mechanism comprising a cam 123, see Figs. 9, 10, 10A and 11, keyed on shaft 86 and provided for imparting in cooperation with a retractile spring 125 a reciprocating oscillatory movement to a lever member 124 pivoted on a stud 126 laterally extending from the supporting plate 119. To the lever 124 is mounted a flat spring or reed 127 yieldably held by a spring 124X, Figs. 10A and 11, against a ratchet toothed rack 128 securely mounted on the plate 114 of carriage 113. A retaining pawl 129, for the rack 128, Figs. 10, 10A, is formed with a projection 130 provided for disengaging the reed 127 from the rack 128 simultaneously with its own disengagement from this rack so as to permit the carriage to return to normal position under the tension of its retractile spring 122, the operation of retaining pawl 129 against the tension of its retractile spring X1 being effected by a spring retracted rod 131, see Figs. 9 and 10, having one of its ends connected to lever 84, keyed on the shaft 82 for movement as a unit with lever 83, keyed to the other end of shaft 82 and having its free end in the form of a cam disposed in engageable relation with one of the diametrically opposite pins 96 on gear 78 so as to be operated once for each half turn of this gear or seventh turn of cam shaft 86 and therefore seventh reciprocating movement of lever 124 as effected by the cam 123.

The rack 128 is formed with seven teeth $th$ of a pitch corresponding to the spacing of combined code and indicating wheels W1, W2, W3, etc., on shaft 25 so as to place in each step the feeler members P1, P2, P3, P4, P5 pivoted on carriage 113 in registry to the successive code portions of wheels W1, W2, W3, etc.

On the base B is mounted an alternating current generator best seen in Figs. 2, 3, 12, 12A and 16 consisting of pole-pieces 140 and 141, a coil 142 and five vibrative reeds V1, V2, V3, V4 and V5, tuned at different frequencies, clamped between the pole pieces 140 and 141 and extending in engageable relation with a corresponding number of lever members as m1, m2, m3, m4 and m5 pivoted on a shaft 143 journaled at both ends in lugs formed with upright support 102. Shaft 143 also serves for pivoting a plate 144 formed with a downwardly extending arm 145 best seen in Figs. 10, 10A and 12 having a roller 146Y engaging a cam 147 keyed on cam shaft 86, the rotation of which in cooperation with a retractile spring 148, see Fig. 12, imparts reciprocating movement to the plate 144 for collectively and successively tensioning the springs 146 to cause the lever members m1, m2, m3, etc., to tension their respective vibrative reeds V1, V2, V3, V4 and V5.

The springs 146 have one of their ends secured to similar studs 150 carried by each lever member m1, m2, m3, etc., and bear on lugs 147 to force the lever members m1, m2, m3, etc., against their respectively associated vibrative elements V1, V2, V3, etc., to flex them upon the operation of plates 144 by the movement of cam 147 due to the engagement of the downwardly extending portion of this plate at the free end thereof with the springs 146, while lugs 146X formed with lever members m1, m2, m3, etc., rest on their respective springs 146 for returning the lever members to normal position following the release of spring 146 by the return of plate 144 to normal under the tension of its retractile spring 148 but as controlled by latching members $l1$, $l2$, $l3$, $l4$ and $l5$ as will be hereinafter described in detail to permit the free operation of the vibrative elements V1, V2, V3, etc., when released by a common pawl-like member 158 actuated by a cam 159, see Figs. 3 and 10A, in timed relation to the operation of plate 144 and that of the plate 106 by cam 111 and lever 124 by cam 123 while springs as 151 tensioned against the undersurface of lug 147 serve to return the lever members m1, m2, m3, etc., in a follow-up movement with that of the common plate 144 toward retracted position.

To the upright support 102 as shown in Figs. 2, 3, 9, 11 and 12 is securely mounted a stud 152 extending perpendicularly therefrom to serve as a spindle for the latching members $l1$, $l2$, $l3$, $l4$ and $l5$. These latching members are moved in engageable relation with the free ends of their respectively associated springs 146 by the tension of ribbon-shaped springs 153 following the downward movement of plate 144, such engagement serving to hold the springs 146 tensioned and the arms m1, m2, m3, etc., operated with their corresponding reeds V1, V2, V3, V4 and V5 tensioned during the operation of a number of bars B1, B2, B3, etc., in predetermined combinations as defined by the setting of the code wheels W1, W2, W3, etc., while similar camming portions 154 formed at the upward extending ends of latching members $l1$, $l2$, $l3$, etc., extend through slots in lugs 155 formed perpendicularly with the bars B1, B2 and B3, etc., to provide bearing surfaces moving against the camming portion 154 of latching members $l1$, $l2$, $l3$, etc., upon the upward operation of U-shaped bars B1, B2, B3, etc., as effected by the springs 108 movable with the plate 106 so as to pivot the latches $l1$, $l2$, $l3$, etc., for disengaging them from the springs 146 and thereby freeing the arms m1, m2, m3, etc., which are returned to normal by springs 151 to permit the vibrations of elements V1, V2, V3, etc., the corresponding feeler members of which are permitted to enter the notches in the code wheels W1, W2, W3, etc., which is followed by the release of these vibrative elements by the common pawl-like member 158.

In a typical operation in the setting and transmitting of signals corresponding to a telephone call designation for example CH 31000, the operation of key K2, in registry with the letter C, the first letter of the code designation above mentioned, printed on the cover plate 19 is effective to actuate the bar 47 through its camming portion C2, see Figs. 5, 6, 7 and 8 and thereby the bar 51 both carried by the triangularly-shaped lever members 48 and 49 pivoted on shaft 50 for collectively positioning the setting pawls r1, r2, r3, r4, r5, r6 and r7 relative to the teeth of the spirally formed ratchet portions e1, e2, e3, e4, e5, e6 and e7 of the combined code and indicating wheels W1, W2, W3, W4, W5, W6 and W7.

The operation of key K2 also actuates the common bar 55 and angle lever 56 pivoted on shaft 16 simultaneously with the operation of setting pawls r1, r2, r3, etc., and actuate the yoke 58 through rod 57 best seen in Figs. 7 and 8 for tensioning the spring 38 which, as above mentioned, is coiled concentric to stud 59 and one of its ends hooked at the point h to the arm 34 of pivoted escapement element 33 for operating it upon the release of the latter by the operation of spring-pressed pawl 61 which operation is effected by the movement of yoke 58 through its arm 64 engaging the arm 61A of pawl 61 as shown in Fig. 8. The operation of escapement element 33 by the tension of spring 38 from the position shown in Fig. 7 to the position shown in Fig. 8 is effective to engage the reed 30 now at points 1Y, Fig. 6B, to move and disengage it from the tooth 5Y of stationary rack 32 when the lever 17 under tension of spring 31 is moved a small angular movement limited by the engagement of reed 30 with tooth 6Y of movable rack 33 and the reed 30 is now in position indicated in dotted line in alignment with the downwardly extending arm 29 of pawl 26 to move it out of engagement from the concentric ratchet portion 27 of code wheel W1, upon the continued swinging movement of escapement element 33 for permitting the operation of wheel W1 under the tension of its retractile spring 66, this wheel being arrested by the tooth of its spirally formed ratchet portion engaging its respective setting pawl r1 indicated in Fig. 16 thus setting the code wheel W1 to the position corresponding to the key depressed that is, $$\frac{ABC}{2}$$

indicated by the dial Z1 through the transparent window TW in the casing 24.

The release of key K2 by the operator and its consequent return movement to normal position under the tension of its retractile spring 18 permits the return movement of common bar 55 and that of angle lever 56 and thereby that of yoke 58, to normal position. In that position the yoke 58 reengages the pin 60 carried by arm 34 of the pivoted escapement element 33 for returning the latter to normal position where it is held by the latch or spring-pressed pawl member 61. Upon the return movement of escapement element 33 to normal position, the reed 30 which is now to the position 2Y is arrested by the apex of tooth 5Y of the stationary rack element 32 causing its disengagement from the tooth 6Y during the continued return movement of escapement rack element 33 for permitting the movement of lever 17 under the tension of spring 31 so as to move the reed 30 in position 3Y against the tooth 7Y of stationary escapement element 32 preparatory to the operation of the succeeding key, that is, key $$\frac{GHI}{4}$$

the second digit of the telephone call designation above mentioned. The return of movable rack element 33 permitting the pawl 26 to engage the corresponding tooth of ratchet portion 27 for holding this wheel in the set position.

The operation of key $$\frac{GHI}{4}$$

the second digit of the telephone call designation above mentioned, causes the oscillatory or swinging movement of the triangularly-shaped lever members 48 and 49, as effected by the engagement of the cam portion C4 of key K4, Fig. 6, with bar 47 to cause the operation of setting pawls r1, r2, r3, etc., collectively, through their engagement with the bar 51 to a level or position wherein the release and the consequent rotation of the code wheel W2 will be arrested by its respectively associated setting pawl r2 engaging the tooth $$\frac{GHI}{4}$$

Figure 17:
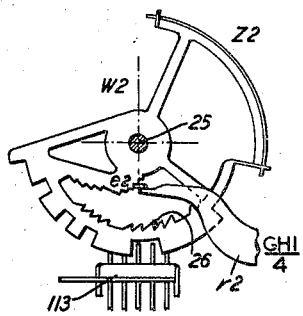
Figure 18:
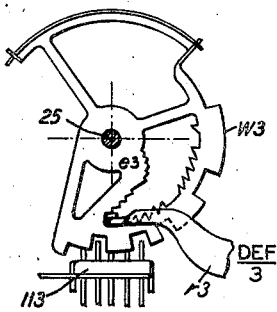
Figure 19:
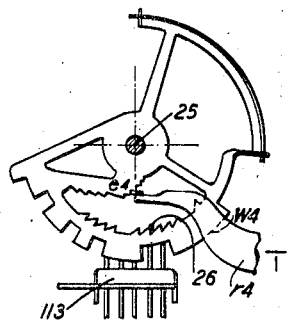
Figure 20:
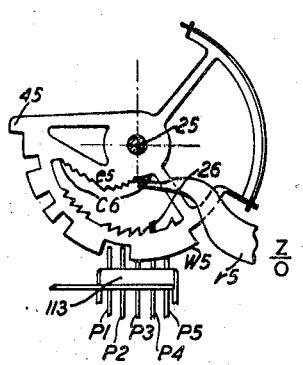

Fig. 17 of spirally disposed ratchet portion e2. The release of wheel W2 is effected by the movement of rack element 33 from normal followed by the movement of lever 17 under the tension of spring 31 to place the reed 30 against the tooth 8Y of movable rack 33 in registry with the downward extending arm 29 of retaining pawl 26 associated with code wheel W2. The return movement of key $$\frac{GHI}{4}$$

to normal position and the consequent arresting of the movement of reed 30 by tooth 7Y of stationary rack 32, permits the movement of the lever 17 for placing the reed 30 carried thereby against the tooth 9Y of stationary rack 32 and this cycle of operations for the setting of wheels W3, W4, W5, W6 and W7 to the position registering 31000 is similar to that described in connection with the code wheels W1 and W2 set by the operation of the keys $$\frac{ABC}{2} \text{ and } \frac{GHI}{4}$$

respectively. It is to be noted that the retaining pawls 26, unlike the setting pawls r1, r2, r3, etc., are operated individually and successively by the transverse movement of reed 30 and that the other retaining pawls with the exception of the pawls which is in registry with the reed 30 remain in engagement with their respective code wheels during the operation of any particular key.

The manual operation of handle lever 70 following the setting of the telephone call designation $$\frac{ABC}{2} - \frac{GHI}{4} - 3\ 1000$$

as above described is effective to tension the motor spring 91 and to impart a pivotal movement to arm 95 for disengaging it from one of the pins 96 as the case may be carried by gear 78, the operation of arm 95 being effected through the movement of arm 99 keyed on the shaft 71 and engaging the pin 100 carried by arm 99.

The half turn rotation of gear wheel 78 as imparted by the gear sector 74, pinion 75, ratchet wheel 77 and the spring-pressed pawls 101 best seen in Figs. 9 and 13 is transmitted to pinion 79 and thereby to gear 81 securely mounted at the end of sleeve 80 in turn mounted for free rotation on shaft 82. The rotation of gear 81 actuates the pinion 85 keyed on one end of cam shaft 86, the speed of which is controlled by the governor CG actuated by the pinion 87 and gear 88 mounted for rotation as a unit on spindle 89, the gear ratio as above mentioned being such as to impart seven turns to cam shaft 86 for each operation of handle lever 70 or half turn of gear wheel 78.

Figure 16:
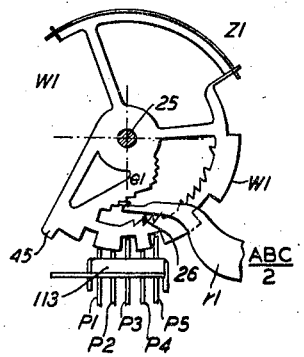

With the carriage 113 in normal position as shown in Figs. 9 and 10 and the motor spring tensioned by the downward movement of handle 70, the rotation of cam shaft 86 through cam 146Y imparts a downward movement to the plate 144, Figs. 10, 10A and 12, for tensioning the springs 146 and thereby causing the arms $m1$, $m2$, $m3$, $m4$ and $m5$ to tension their respective vibrative elements V1, V2, V3, V4 and V5 through the engagement of the springs with lugs 147 of levers $m1$, $m2$, $m3$, etc. Upon the continued operation of cam shaft 86, the cam 159 permits the common pawl-like member 158 to move in position wherein the vibrative elements are collectively held in the tensioned position and retained in such a position due to the latch members $l1$, $l2$, $l3$, etc., engaging the free ends of springs 146 as shown in Fig. 15 at the maximum downward movement of plate 144. However, upon the return of plate 144 to normal unoperated position following the continued operation of cam shaft 86 and the movement of plate 106 a number of U-shaped bars as in this example bars $b3$ and $b5$, see Fig. 16, are permitted to follow the movement of plate 106 under the tension of their springs 108 due to feeler members $r3$ and $r5$ entering the notches in the code wheel W1 thus causing the movement of their respective latching members $l3$ and $l5$ operated by U-bars $b3$ and $b5$ and therefore the upward movement of arms $m3$ and $m5$ under the tension of their springs 151 which is followed by the operation of pawl-like member 158 by cam 159 and the consequent operation of vibrative elements V3 and V5 for transmitting a signal corresponding to the operated key K2, while the upward movement of feeler member R1, R2 and R4 is prevented during the movement of plate 106 by the engagement of these feeler members with the periphery of code wheel W1.

The cam 123 is now in position to engage the roller at the end of lever member 124 for pivoting the latter against the tension of its retractile spring 125 and causes the reed 127 to engage the tooth X1, Fig. 10 of rack 128, to move it and the carriage 113 one step in the direction indicated by the arrow for positioning the feeler members P1, P2, P3, P4 and P5 in registry with the code wheel W2 where the carriage 113 is held in this advanced position by the retaining pawl 129 and this sequence of operation is repeated for each turn of cam shaft 86. Upon the movement of cam shaft 86 a small angular distance from its normal set position following the transmitting of the seven signals corresponding to the keys depressed, that is, $$\frac{ABC}{2} - \frac{GHI}{4} - 3\text{-}1\text{-}0\text{-}0\text{-}0\text{-}0$$

one of the pins 96 as the case may be carried by gear wheel 78 engages the arm 83 for imparting a small angular movement to its supporting shaft 82 and thereby to lever 84 keyed to the other end of this shaft for moving the rod 131 longitudinally against the tension of its retractile spring 132 for pivoting the retaining pawl 129 to disengage it from rack 128 while flexing the reed 127 away from this rack so as to permit the return movement of carriage 113 to normal starting position under the tension of its retractile spring 122. One of the pins 96 immediately following the operation of pawl 129 and reed 127 engages the arm 95 to stop the rotation of gear wheel 78 and that of gear sector 74. The indicating wheels W1, W2, W3, etc. are then returned to normal non-operated position while retensioning their actuating springs by the manual operation of handle lever 36 rotating the bar 42 concentric to the wheels and imparting a pivotal movement to lever 17 through rod 39 for returning this lever and the reed 30 carried thereby to normal starting position and the transmitter is now ready for a succeeding call setting and transmitting operation.

What is claimed is:

1. In a call transmitter, a set of key members, a plurality of code wheels, an actuating spring for each of said wheels, a handle means actuated by the operation of said handle for rotating said wheels for collectively tensioning said actuating springs, means for holding said wheels in normal position against the tension of said actuating springs, each of said key members having a cam, an escapement mechanism responsive to the operation of each of said key members for successively operating said holding means to cause the operation of said wheels by said actuating springs, and other means actuated differentially by the cams of said key members for controlling the movement of said code wheels to positions for setting a call.

2. In a call transmitter, a set of digit key members, code wheels, a plurality of motor springs for actuating said wheels, a handle, a pivoted bar actuated by said handle for collectively moving said wheels from operated to normal position for tensioning said motor springs, ratchet elements of different characters carried by each of said wheels, operable means cooperating with the ratchet elements of one of said characters for holding said wheels in normal non-operated position against the tension of said motor springs, a mechanism actuated by said key members for operating said holding means for releasing said wheels, and other means actuated by said mechanism cooperating with the ratchet elements of the other character for controlling the operation of said code wheels under the tension of said motor springs to positions according to the digits of said key members for setting a call.

3. In a call transmitter, a set of key members, a plurality of code wheels, spring means for actuating said wheels, ratchet mechanisms for holding said code wheels in normal non-operated position against the tension of said spring means, a mechanism actuated by each of said key members for successively operating said ratchet mechanisms for permitting the movement of said wheels under the tension of said spring means, other ratchet mechanisms, spring actuated means controlled by the operation of each of said key members in timed relation to the operation of the second-mentioned mechanisms for controlling the movement of said code wheels to positions corresponding to the operation of said key members, means carried by said code wheels for indicating such positions, a handle and means operable by the movement of said handle for returning said code wheels collectively to normal position, the return of said code wheels tensioning said spring means.

4. In a call transmitter, a set of key members, a shaft, a plurality of combined code and indicating wheels mounted for free rotation on said shaft, a plurality of normally tensioned spring means for rotating said wheels, ratchet elements carried by said wheels concentric thereof, pawls engaging said ratchet wheels for normally holding the latter in normal non-operated position against the tension of said spring means, other ratchet elements carried by said wheels spirally thereof, a pawl operatively associated with each of said spirally disposed ratchet elements, each of said key members having a cam, an escapement mechanism operated by said key members for successively actuating the pawls of the first-mentioned ratchet elements to cause the operation of said code wheels under the tension of said spring means, and a mechanism actuated by the cam of each of said key members for controlling the operation of the second-mentioned pawls relative to said spirally disposed ratchet for determining the angular movement of said code wheels for setting a call.

5. In a call transmitter, a set of digit numbered key members, a plurality of combined code and indicating wheels, a plurality of means actuated by said key members to cause the operation of said wheels to positions corresponding to the digits of said key members, spring means for actuating said wheels to said positions, a supporting shaft for said wheels, a bar pivoted on said shaft for movement concentric to said wheels, and manually operable means for actuating said bar for returning said wheels to normal position for cancelling a call and simultaneously collectively tensioning said spring means.

6. In a call transmitter, a set of digit numbered key members, a set of code wheels, means actuated by the successive operation of said key members to cause the movement of said wheels to positions corresponding to the digits of said key members for setting a call, an alternating current generator having vibrative elements, a motor spring, a handle for tensioning said motor spring, a cam shaft rotated by said motor spring, and a plurality of means actuated by said cam shaft for controlling the operation of said vibrative elements according to the code wheels set by the operation of said key members.

7. In a call transmitter, a set of digit numbered key members, a plurality of code wheels, a plurality of means actuated by said key members to cause the successive movement of said wheels to positions for setting a call, a carriage, feeler members movable on said carriage, an alternating current generator having vibrative elements, a motor, and a plurality of means actuated by said motor for moving said feeler members in coacting relation with said code wheels successively, for controlling the operation of said vibrative elements according to the operation of said key members.

8. In a call transmitter, a set of digit numbered key members, a plurality of code wheels, a plurality of means actuated by said key members to cause the operation of said wheels to positions for setting a call, an alternating current generator having a plurality of vibrative reeds, motor means, a cam shaft actuated by said motor means, feeler members, a mechanism actuated by said cam shaft for positioning said feeler members in registry positions with said code wheels in a step-by-step movement collectively, and other means actuated by said cam shaft to cause said feeler members to engage said code wheels for determining the operation of said vibrative reeds at each of said steps for transmitting signals according to the operation of said key members.

9. In a call transmitter, a set of key members, a plurality of code wheels, normally tensioned spring means for actuating said wheels, means normally holding said wheels against movement under the tension of said spring means, means actuated by said key members for operating the second-mentioned means to cause the movement of said wheels in position corresponding to the operation of said key members for setting a call, an alternating current generator having vibrative elements, a motor mechanism having a cam shaft, a plurality of U-shaped bars, feeler members, a stop and go actuating mechanism operated by said cam shaft for moving said feeler members transverse of said code wheels, means actuated by said cam shaft for tensioning said vibrative elements, other means operated by said cam shaft for actuating said bars for engaging said feeler members with said code wheels upon each stop transverse of the latter, and a third means actuated by said cam shaft for momentarily holding said vibrative elements tensioned during the engagement of said feeler members with said code wheels, said third means operating for releasing said vibrative elements to cause their operations according to the setting of said code wheels.

10. In a call transmitter, a set of digit numbered key members, code wheels, an escapement mechanism, ratchet elements actuated by the successive operation of said key members to cause the movement of said wheels into positions for setting a call, a carriage having feeler members movable thereon, an alternating current generator having normally tensioned vibrative elements, a motor spring, a handle lever for tensioning said motor spring, a cam shaft, a gearing mechanism connecting said cam shaft to said motor, and a step-by-step operable mechanism actuated by the movement of said cam shaft for successively moving said carriage for positioning said feeler members in coacting relation with said code wheels and releasing said vibrative elements to cause their vibrations in timed relation with the step-by-step movements of said carriage for transmitting signals corresponding to the operation of said key members.

11. In a call transmitter, a set of key members, code elements movable upon the operation of said key members into position for setting a call, a plurality of U-shaped pivoted bars, feeler members disposed for operation by the movement of said bars, a cam shaft, a pivoted plate actuated by said cam shaft, spring means tensioned by the movement of said plate for operating said U-shaped bars for moving said feeler members in coacting relation with said code elements, an alternating current generator having vibrative elements, another plate actuated by said cam shaft, spring means tensioned collectively by the operation of the last-mentioned plate, arms moved by the tension of the last-mentioned springs for flexing said vibrative elements, a common latching member operated by said cam shaft for momentarily holding said vibrative elements tensioned, camming means actuated by the operation of said U-shaped bars as determined by said code wheels for releasing a number of the last-mentioned springs for permitting the return movement to normal of a corresponding number of said arms prior to the collective release of said vibrative elements by said common latching member, the release and vibrations of said elements upon the successive operations of the first and second-mentioned plates and said common latching member under control of said cam shaft transmitting signals corresponding to the operation of said key members.

12. In a call transmitter, a set of digit numbered key members, a plurality of code and indicating wheels, normally tensioned spring means for actuating said wheels, operable ratchet elements for holding said code wheels in normal position under the tension of said spring means, a mechanism actuated by the operation of said key members for successively operating said ratchet elements for causing the movement of said wheels in positions for setting a call, spirally formed ratchet elements carried by said wheels, a setting pawl associated with each of said spiral ratchet elements, a cam carried by each of said key members, an oscillating shaft actuated by said cams upon the operation of said key members for positioning said setting pawls relative to the teeth of said spiral ratchet elements for stopping the movement of said wheels at angular distances corresponding to the digits of the operated keys, an alternating current generator having vibrative reeds, an actuating mechanism for said reeds, said mechanism comprising a motor, feeler members actuated step by step transverse of said wheels by said motor, means for engaging said feeler members with said code wheels at each of said steps and reciprocating movements for actuating said vibrative reeds for transmitting signals corresponding to the operation of said key members, and manually operable means for returning said wheels to normal non-operated position and tensioning said spring means following the transmitting of the call.

13. In a call transmitter, a set of key members, a plurality of code elements, normally tensioned springs for moving said elements to positions determined by the operation of said key members for setting a call, means actuated by said key members for defining such positions, a rail support, a carriage mounted on said support for movement transverse of said code elements, a cam shaft, a mechanism actuated by said cam shaft for effecting the transverse movement of said carriage, pivoted U-shaped bars, feeler members mounted on said carriage and operated by the movement of said bars upon the transverse operation of said carriage for placing said feeler members successively in coacting relation with said code elements, a plate actuated by said cam shaft, spring means movable with said plate for moving said bars to cause the engagement of said feeler members with said code elements, an alternating current generator having vibrative elements, one for each of said bars, another plate actuated by said cam shaft, a plurality of springs tensioned collectively by the operation of the last-mentioned plate, arms movable by the tension of the last-mentioned springs for flexing said vibrative elements, means actuated by said cam shaft for momentarily locking said vibrative elements in said tensioned positions, camming means actuated by the operation of said U-shaped bars as determined by the set positions of said code wheels for releasing a number of the last-mentioned springs for permitting the freeing of a corresponding number of said reeds by said arms, the release of the last-mentioned vibrative elements transmitting signals corresponding to the operation of said key members, means operable at the completion of the transmitting of the call for returning said carriage to normal non-operated position, and means manually operable for returning said code elements to normal unoperated position and tensioning each of the first-mentioned springs.

14. In a call transmitter, a set of key members, a plurality of combined code and indicating movable elements, each of said elements having a concentrically disposed ratchet portion and a spirally shaped ratchet portion, normally tensioned springs for actuating said movable elements, pawls engaging said concentric ratchet portions for holding their associated movable elements in normal position against the tension of said actuating springs, cams of different values carried by said key members, means actuated by said cams for positioning the pawls associated with said spirally formed ratchet portions for limiting the movement of said combined code and indicating elements to positions corresponding to the digits of the operated key members following the release of said elements by the pawls engaging said concentric ratchet portions, an angle lever, a bar operated by the movement of each of said key members for actuating said angle lever, an escapement mechanism actuated by the movement of said angle lever for actuating the pawls engaging said concentric ratchet portions for permitting the successive movement of said elements for setting a call, said mechanism comprising a pivoted arm having its free end movable transverse of said combined code and indicating elements, a normally tensioned spring for moving said arm in such transverse movement, a yieldable member carried by said pivoted arm at the free end thereof, a stationary rack having teeth for engagement with said yieldable member for successively retaining said arm and said yieldable member in positions relative to the pawls associated with said spiral ratchet portions, a movable rack, a yoke actuated by the operation of said angle lever under control of said key members, a spring tensioned by the movement of said yoke for actuating said movable rack, a latch for normally holding said movable rack to normal against the tension of the last-mentioned spring, means carried by said yoke for actuating said latch to cause the operation of said movable rack for flexing said yieldable member for actuating the pawls associated for the concentric ratchet portions of said code and indicating elements to cause the rotation of the latter to points determined by the setting of the pawls associated with the spirally shaped ratchet portions of said elements, for setting and indicating the call, an alternating current generator, a motor mechanism controlled by said code and indicating elements for actuating said generator, and manually operable means for returning said combined code and indicating elements and said pivoted arm to normal position following the transmitting of a call and/or for cancelling a call.

DAVID B. PARKINSON.

REFERENCES CITED

The following references are of record in the file of this patent:

UNITED STATES PATENTS

| Number | Name | Date |
|---|---|---|
| 2,358,586 | Newell | Sept. 19, 1944 |
| 2,315,344 | Mallina | Mar. 30, 1943 |
| 2,307,525 | Mallina | Apr. 1, 1941 |
| 2,121,584 | Calkins | June 21, 1938 |
| 2,258,266 | Sengebusch | Oct. 7, 1941 |
| 2,285,153 | Fletcher | June 2, 1942 |